United States Patent
Kim

(10) Patent No.: US 8,200,989 B2
(45) Date of Patent: Jun. 12, 2012

(54) EXTERNAL MEMORY ACCESS DEVICE AND METHOD OF ACCESSING EXTERNAL MEMORY

(75) Inventor: Young Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 592 days.

(21) Appl. No.: 12/170,105

(22) Filed: Jul. 9, 2008

(65) Prior Publication Data

US 2009/0125725 A1    May 14, 2009

(30) Foreign Application Priority Data

Nov. 9, 2007   (KR) .................. 10-2007-0114019

(51) Int. Cl.
*G06F 11/30*   (2006.01)
*G06F 21/00*   (2006.01)

(52) U.S. Cl. ..................... 713/193; 713/182

(58) Field of Classification Search .......... 713/182, 713/184, 193; 726/26, 27; 705/55
See application file for complete search history.

(56) References Cited

U.S. PATENT DOCUMENTS

| 5,070,479 | A  | * | 12/1991 | Nakagawa | 714/11 |
|---|---|---|---|---|---|
| 5,182,770 | A  | * | 1/1993 | Medveczky et al. | 705/56 |
| 6,725,382 | B1 | * | 4/2004 | Thompson et al. | 726/19 |
| 7,353,399 | B2 | * | 4/2008 | Ooi et al. | 713/186 |
| 7,392,941 | B2 | * | 7/2008 | Choi | 235/382 |
| 7,743,241 | B1 | * | 6/2010 | Moore | 713/2 |
| 7,774,829 | B2 | * | 8/2010 | Waltermann et al. | 726/6 |
| 7,814,337 | B2 | * | 10/2010 | Lee et al. | 713/193 |
| 2001/0002487 | A1 | * | 5/2001 | Grawrock et al. | 713/193 |
| 2003/0167395 | A1 | * | 9/2003 | Chang et al. | 713/183 |
| 2004/0039911 | A1 | * | 2/2004 | Oka et al. | 713/175 |
| 2004/0083393 | A1 | * | 4/2004 | Jordan et al. | 713/202 |
| 2004/0117665 | A1 | * | 6/2004 | Ong | 713/202 |
| 2005/0125698 | A1 | * | 6/2005 | Yeates et al. | 713/202 |
| 2005/0144484 | A1 | * | 6/2005 | Wakayama | 713/202 |
| 2006/0234797 | A1 | * | 10/2006 | Davis et al. | 463/43 |
| 2007/0223955 | A1 | * | 9/2007 | Kawabuchi et al. | 399/80 |
| 2009/0097459 | A1 | * | 4/2009 | Jendbro et al. | 370/338 |
| 2010/0146264 | A1 | * | 6/2010 | Blume et al. | 713/156 |

* cited by examiner

*Primary Examiner* — Philip Chea
(74) *Attorney, Agent, or Firm* — Jefferson IP Law, LLP

(57) ABSTRACT

An external memory access device and a method of accessing an external memory are provided. The external memory access device includes an internal memory unit for storing authentication information of at least one external memory and a control unit for extracting the authentication information from the internal memory unit, transmitting the authentication information to an installed external memory, and controlling to display accessibility of the external memory according to the result of a comparison between the stored authentication information and the authentication information of the external memory. Accordingly, a data security function is provided by setting a password to an external memory and enabling an access to the external memory in an authenticated terminal, and convenient access to the external memory is provided by managing a password and an automatic password decrypting function of the corresponding external memory in the terminal without requiring repeated input of the password.

19 Claims, 3 Drawing Sheets

EXTERNAL MEMORY ACCESS DEVICE AND METHOD OF ACCESSING EXTERNAL MEMORY

PRIORITY

This application claims the benefit under 35 U.S.C. §119(a) of a Korean patent application filed in the Korean Intellectual Property Office on Nov. 9, 2007 and assigned Serial No. 2007-0114019, the entire disclosure of which is hereby incorporated by reference.

BACKGROUND OF THE INVENTION

1. Field of the Invention

The present invention relates to a device and method for accessing an external memory. More particularly, the present invention relates to a device and method for enabling security preservation of an external memory installed in a terminal and easy access to the external memory.

2. Description of the Related Art

With the advances in mobile communication technology, mobile terminals now selling in the market include additional functions such as an MP3 player, a camera, and a video player in addition to a communication function. Due to the increased number of functions, portable terminals require a high capacity memory that can store a large amount of data such as music files, image files taken by a camera, moving pictures and the like. However, providing sufficient memory space for data generated by the additional functions is difficult. Sufficient memory space is difficult to provide because an internal memory unit for the terminal is expensive. Moreover, the application programs necessary for operating the terminal already occupy a large amount of the memory capacity. In order to address the problem of memory shortage, an external memory slot for utilizing an external memory is provided in the terminal to expand the memory capacity.

By installing the external memory in the external memory slot of the terminal, the memory capacity of the terminal is expanded by the memory capacity of the external memory. Also, exchange of data between terminals having a compatible external memory slot becomes more convenient by simply exchanging the external memory between the terminals. If the external memory is not password protected, the external memory may be freely used in any terminal having a compatible external memory slot. That is, the external memory may be used in any terminal supporting the external memory and a user of a terminal in which the external memory is installed can read and write data to and from the external memory. Therefore, data security of the external memory is very low.

One proposal to address the lack of data security is found in Korean Patent Publication No. 1997-29173. There, it is disclosed that usage of an external memory could be regulated by setting a password of the external memory. However, a user must input the password each time the external memory is installed in the terminal because the password is stored in the external memory. Accordingly, if the password is lost, the external memory must be reformatted for reuse and thereby all the data in the external memory would be deleted.

SUMMARY OF THE INVENTION

An aspect of the present invention is to address at least the above-mentioned problems and/or disadvantages and to provide at least the advantages described below. Accordingly, an aspect of the present invention is to provide an external memory access device that enables a password registration for accessing an external memory and management of the registered password in a terminal, and a method of accessing the external memory.

Another aspect of the present invention is to provide an external memory access device that enables an easy access to an external memory by managing a password of the corresponding external memory in a terminal, and a method of accessing the external memory.

In accordance with an aspect of the present invention, an external memory access device is provided. The memory access device includes an internal memory unit for storing authentication information of an external memory and a control unit for extracting the authentication information from the internal memory unit, for transmitting the authentication information to an installed external memory, and for controlling accessibility of the external memory according to the result of a comparison between the stored authentication information and the authentication information of the external memory.

In accordance with another aspect of the present invention, a method of accessing an external memory is provided. The method includes identifying, if an external memory set with a password is installed, whether an automatic password decrypting option corresponding to the installed external memory is set in a corresponding internal memory unit, extracting, if an automatic password decrypting option corresponding to the installed external memory is set in the internal memory unit, a password corresponding to the installed external memory from the internal memory unit and transmitting the extracted password to the external memory, comparing a password set in the installed external memory with the password extracted from the internal memory unit, and receiving, if the password set in the installed external memory is identical to the password extracted from the internal memory unit, an access permission message from the external memory, and displaying the access permission message.

According to the present invention, a data security function is provided by setting a password to an external memory and enabling an access to the external memory by an authenticated terminal, and a convenient access to the external memory is provided by managing a password and an automatic password decrypting function of the corresponding external memory in the terminal without requiring repeated input of the password.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to exemplary embodiments of the present invention, authentication information for enabling access to an external memory is stored in an internal memory unit of a terminal. If an external memory that is set with an automatic password decrypting option is installed in the terminal, and if the password of the external memory is identical to a password stored in the internal memory unit of the terminal, the terminal permits reading and writing of data in the data area of the external memory.

In an exemplary implementation, a serial number and a password of the external memory are stored in the internal memory unit of the terminal. Further, a flag for setting an automatic password decrypting option of the corresponding external memory may also be stored in the internal memory unit of the terminal.

The term 'terminal' is used in this specification for convenience of description to indicate any digital equipment installable with an external memory. Accordingly, the present invention may be applied to any telecommunication or digital equipment, and their applications, such as a mobile terminal, a mobile phone, a wired/wireless phone, a Portable Multimedia Player (PMP), a Personal Digital Assistant (PDA), a smart phone, an MP3 player, a Global Positioning System (GPS) and the like.

Figure 1:
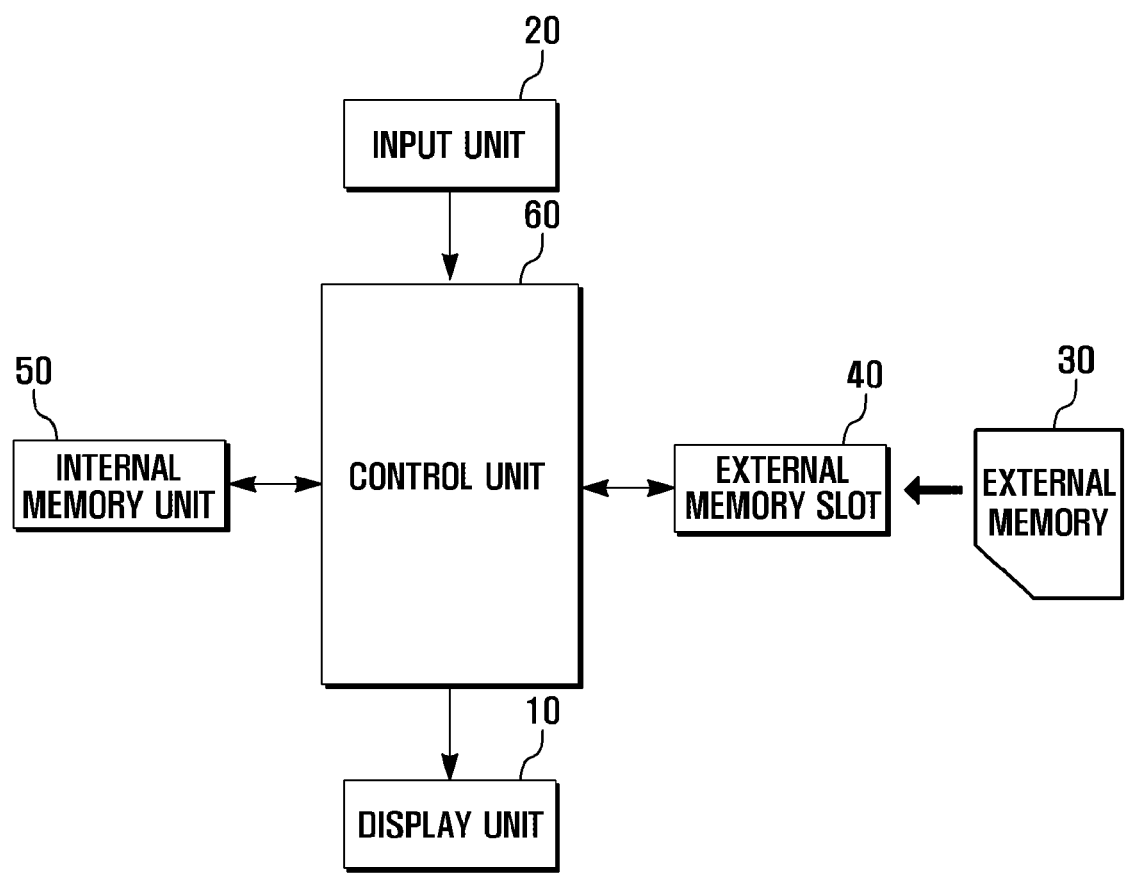
FIG. 1 is a block diagram illustrating a schematic configuration of an external memory access device according to an exemplary embodiment of the present invention.

FIG. 1 is a block diagram illustrating a schematic configuration of an external memory access device according to an exemplary embodiment of the present invention.

Referring to FIG. 1, the external memory access device includes a display unit 10, an input unit 20, an external memory 30, an external memory slot 40 into which the external memory 30 may be inserted, an internal memory unit 50, and a control unit 60.

The external memory 30 stores authentication information for determination of accessibility and permits access to data stored therein if authentication information stored in the terminal is identical to the authentication information stored in the external memory 30. In an exemplary implementation, the external memory 30 is a micro Secure Digital (SD) memory card. However, the present invention is applicable to other and different kinds of external memory devices such as SD, miniSD, Secure Multi Media Card (SecureMMC) and the like.

The input unit 20 may include a keypad having a plurality of letter and number keys as well as function keys. The input unit 20 may also include a touch pad. The input unit 20 receives a user's input for operation of the terminal. In particular, the user must input authentication information corresponding to the external memory 30, for example a password and an automatic password decrypting option, through the input unit 20 to enable access to the data stored in the external memory 30. The password input by the user through the input unit 20 may be stored in either or both of the internal memory unit 50 of the terminal and in the external memory 30. The password may be a combination of alphanumeric and special characters available in the input unit 20. In an exemplary implementation, the password may include audio data such as a specific word or phrase input by the user and stored in the internal memory unit 50 as well as the external memory 30.

The internal memory unit 50 stores programs and various data required for the operation of the terminal. For example, the internal memory unit 50 stores an operating system program used by the terminal for normal operation as well as programs for operating various additional functions such as an MP3 player, a camera function and the like. The internal memory unit 50 includes a data table for storing authentication information of at least one external memory 30. The authentication information may include a serial number unique to the external memory 30, a password, an automatic password decrypting option of the external memory 30 and the like.

The control unit 60 controls general operations of the terminal. The control unit 60 also controls to store a user password corresponding to the matching serial number of the external memory 30 in the internal memory unit 50. Further, the control unit 60 may control to store a flag indicating the automatic password decrypting option in the internal memory unit 50.

If an external memory 30, set with the automatic password decrypting option, is installed in the external memory slot 40, the control unit 60 determines the serial number of the external memory 30. Based on the determined serial number, the control unit 60 transmits the user password matched with the serial number of the corresponding external memory 30 to the external memory 30. If an access permission signal is then received from the external memory 30, the control unit 60 permits reading and writing of data to and from the external memory 30. If an access refusal signal is received due to non-matching of the user password with the password set in the external memory 30, the control unit 60 requests the user to change the user password by entering a new password. If the user changes the user password, the control unit 60 changes the authentication information in the internal memory unit 50, namely, a password in the internal memory unit 50.

Additionally, when access to the external memory 30 is permitted by matching the user password with the password set in the external memory 30, the control unit 60 may permit changing the password set in the memory unit 30. In this case, the control unit 60 also changes the password stored in the internal memory unit 50.

Figure 2A:
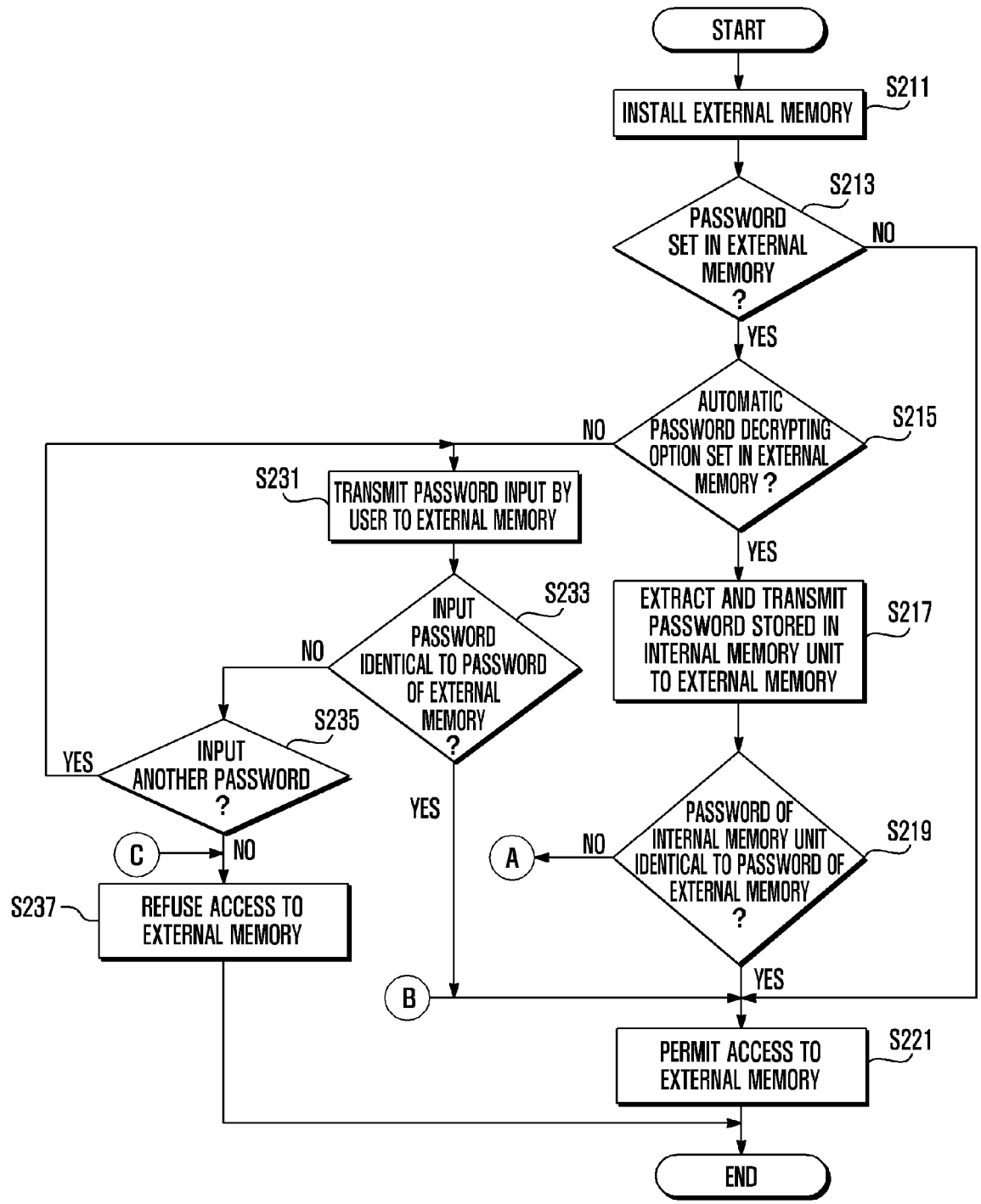
FIGS. 2A and 2B are flowcharts illustrating a method of accessing an external memory according to another exemplary embodiment of the present invention.
Figure 2B:
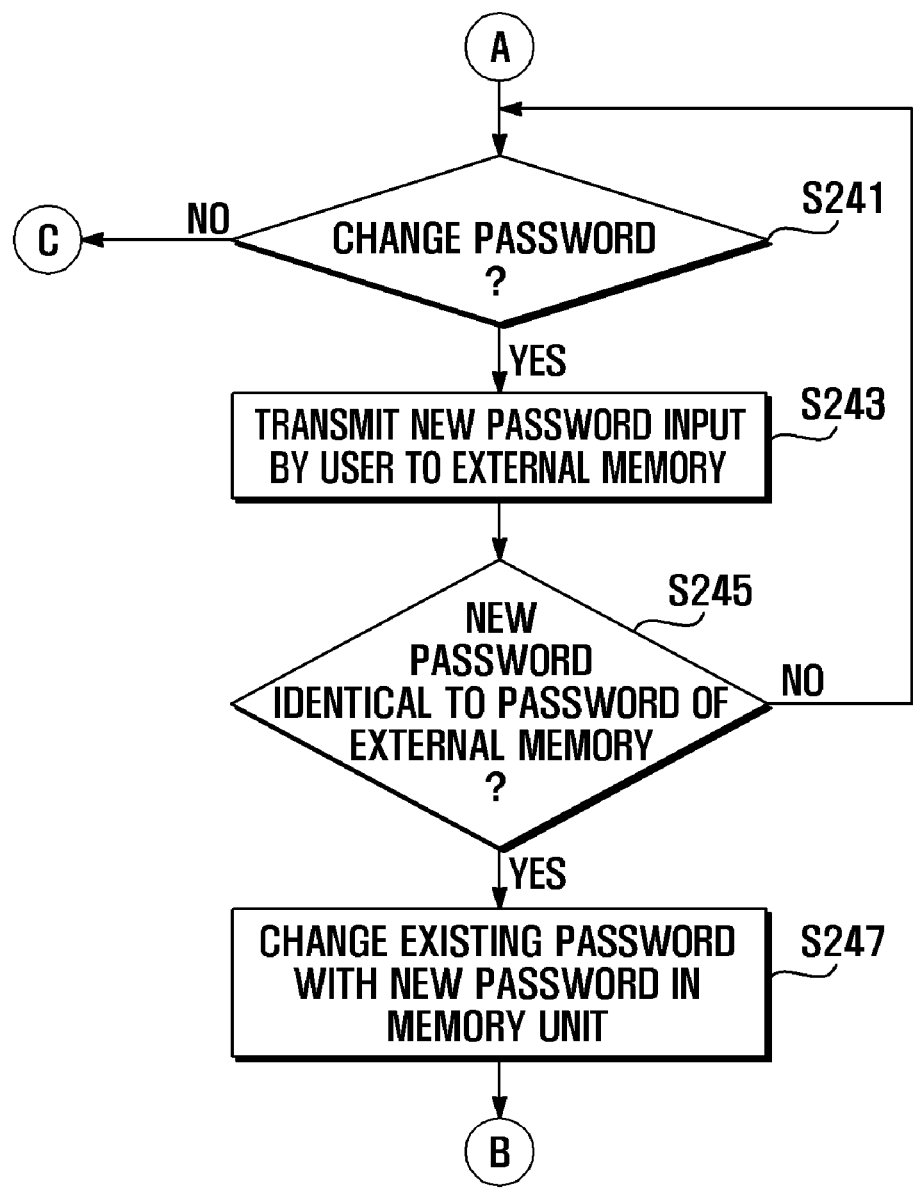

FIGS. 2A and 2B are flowcharts illustrating a method of accessing an external memory according to an exemplary embodiment of the present invention.

In a method of accessing an external memory according to an exemplary embodiment of the present invention, the terminal must have authentication information of the external memory 30. Accordingly, a process of registering authentication information of the external memory 30 in the internal memory unit 50 of the terminal must be performed. Such a process is briefly described as follows (not shown in FIGS. 2A and 2B).

If an external memory 30 is installed in the external memory slot 40 of the terminal, the control unit 60 determines a serial number of the installed external memory 30. Using the serial number of the installed external memory 30, the control unit 60 stores a password input by the user in the internal memory unit 50. More specifically, the control unit 60 receives a password, input by a user and corresponding to the installed external memory 30, and stores the password matched with the corresponding serial number in the internal memory unit 50. In addition to setting the password, the user may set an automatic password decrypting option of the corresponding external memory 30. The control unit 60 stores the automatic password decrypting option, matched with the serial number and the password, in the internal memory unit 50 of the terminal.

Hereinafter, a method of accessing an external memory according to an exemplary embodiment of the present invention is described referring to FIG. 2A.

When an external memory 30 is installed in the external memory slot 40 of the terminal in step S211, the control unit 60 determines whether a password is set in the external memory 30 in step S213. That is, the control unit 60 determines if the external memory 30 is protected by a password.

If no password is set in the external memory 30, the control unit 60 permits access to the external memory 30 for reading and writing data to and from the external memory 30 in step S221.

If it is determined in step S213 that a password is set in the external memory 30, the control unit 60 determines whether an automatic password decrypting option is set in the external memory 30 in step S215. In an exemplary implementation, the control unit 60 determines if an automatic password decrypting option is set by determining the serial number of the installed external memory 30. Using the serial number of the installed external memory 30, the control unit 60 searches for a flag, indicating that the automatic password decrypting option is set, matched with the corresponding serial number from a data table of the internal memory unit 50.

If an automatic password decrypting option is set in the external memory 30, the control unit 60 extracts a password matched to the serial number of the external memory 30 from the data table of the internal memory unit 50 and transmits the extracted password to the external memory 30 in step S217. The external memory 30 determines whether the password received from the terminal is identical to the password of the external memory 30 in step S219.

If the password received from the terminal is identical to the password of the external memory 30, the external memory 30 permits access by transmitting an access permission message to the terminal, and the control unit 60 enables data reading and writing to and from the external memory 30 in step S221. The case that the password received from the terminal is not identical to the password of the external memory 30 at step S219 is described later referring to FIG. 2B.

If it is determined that an automatic password decrypting option is not set in the external memory 30 at step S215, the control unit 60 requests the user to input a password. The control unit 60 transmits the password input by the user to the external memory 30 in step S231.

The external memory 30 determines whether the password received from the terminal is identical to the password of the external memory 30 in step S233. If the password received from the terminal is identical to the password of the external memory 30, the external memory 30 permits access by transmitting an access permission message to the terminal, and the control unit 60 enables data reading and writing to and from the external memory 30 in step S221.

However, if the password received from the terminal is not identical to the password of the external memory at step S233, the external memory 30 transmits an access refusal message to the terminal, and the control unit 60 requests the user to input another password in step S235. If the user inputs another password, steps S231 and S233 are repeated to transmit the password to the external memory 30 and to compare the passwords. If the user does not input another password at step S235, the control unit 60 informs the user of refusal of access to the external memory 30 in step S237, and terminates the process of accessing the external memory 30.

Hereinafter, the case that the password received from the terminal is not identical to the password of the external memory 30 is described referring to FIG. 2B. That is, the case resulting from step S219 if the password extracted from the internal memory unit 50 is not identical to the password of the external memory 30.

If it is determined that the password received from the control unit 60 is not identical to the password of the external memory 30 at step S219, the external memory 30 transmits an access refusal message to the terminal. The control unit 60 receives the access refusal message and determines that the password of the external memory 30 has been changed or otherwise does not match the password stored in the internal memory 50. Because the passwords do not match, the control unit 60 determines if the user desires to change the password corresponding to the external memory 30 stored in the internal memory unit 50 in step S241.

If the user determines not to change the password, the control unit 60 informs the user that access to the external memory 30 is not permitted in step S237, and terminates the process of accessing the external memory 30. However, if the user decides to change the password at step S241, the control unit 60 requests the user to input a new password, and transmits the new password input by the user to the external memory 30 in step S243.

The external memory 30 determines whether the received new password is identical to the password set in the external memory 30 in step S245. If the received password is not identical to the password set in the external memory 30, the external memory 30 transmits an access refusal message to the terminal. The control unit 60 receives the access refusal message, returns to step S241 and again determines if the user desires to change the password corresponding to the external memory 30 stored in the internal memory unit 50.

Alternatively, if it is determined in step S245 that the received new password is identical to the password set in the external memory 30, the external memory 30 transmits an access permission message to the terminal and permits the terminal to read and write data stored in the external memory 30. The control unit 60 then controls to store the new password input by the user in the internal memory unit 50 in step S247.

As described above, a password identical to a password set in an installed external memory is stored in the internal memory unit. Thereby, a user may easily gain access to the external memory without having to repeatedly input the password corresponding to the external memory.

If a password input by the user is identical to the password set in the external memory, the user can access the external memory installed in the terminal, and thereby the user may perform various operations through the terminal, such as changing the password set in the external memory. If the user changes the password set in the external memory, the control unit also changes authentication information corresponding to the external memory stored in the internal memory unit.

Although exemplary embodiments of the present invention have been described hereinabove, it should be understood that many variations and modifications of the basic inventive concept herein described, which may appear to those skilled in the art, will still fall within the spirit and scope the exemplary embodiments of the present invention as defined in the appended claims and their equivalents.

What is claimed is:

1. An external memory access device, the device comprising:
   an internal memory unit for storing authentication information of at least one external memory; and
   a control unit for extracting the stored authentication information from the internal memory unit, for transmitting the authentication information to a detachably installed external memory, and for controlling accessibility of the external memory by the external memory access device according to the result of a comparison between the stored authentication information and authentication information of the installed external memory,
   wherein the installed external memory is physically connected to the external memory access device,
   wherein the stored authentication information comprises at least one of a serial number and a password of the external memory, and
   wherein the control unit determines if the stored authentication information matches the authentication information of the installed external memory by comparing the extracted password of the external memory with a password from the installed external memory in order to produce the result of the comparison.

2. The device of claim 1, wherein the control unit controls a display of the result of the accessibility comparison.

3. The device of claim 1, wherein the stored authentication information further comprises a value of an automatic password decrypting option for automatically comparing the password stored in the internal memory unit with the password from the installed external memory.

4. The device of claim 3, wherein the control unit determines whether the value of the automatic password decrypting option corresponding to the installed external memory is set in the internal memory unit and extracts, if the value of the automatic password decrypting option is set corresponding to the installed external memory, a password of the corresponding external memory from the internal memory unit and transmits the password to the external memory.

5. A method of accessing an external memory, the method comprising:
   determining, if a detachable external memory set with a password is installed, whether an automatic password decrypting option corresponding to the installed external memory is set in an internal memory unit;
   extracting, if the automatic password decrypting option corresponding to the installed external memory is set in the internal memory unit, a password corresponding to the installed external memory from the internal memory unit and transmitting the extracted password to the external memory;
   comparing a password set in the installed external memory with the password extracted from the internal memory unit; and
   receiving, if the password set in the installed external memory is identical to the password extracted from the internal memory unit, an access permission message from the external memory.

6. The method of claim 5, further comprising displaying the access permission message.

7. The method of claim 5, further comprising:
   requesting, if an automatic password decrypting option corresponding to the installed external memory is not set in the internal memory unit, input of a password corresponding to the installed external memory; and
   transmitting the input password to the installed external memory.

8. The method of claim 7, wherein the requesting of the input of the password comprises requesting a user to input the password.

9. The method of claim 7, further comprising changing, if the password set in the installed external memory is not identical to the password extracted from the internal memory unit, the password set in the internal memory unit with a new password.

10. The method of claim 9, wherein the changing of the password stored in the installed external memory comprises:
    requesting a user to input a new password of the installed external memory;
    transmitting the new password input by the user to the installed external memory; and
    storing, if a password set in the installed external memory is identical to the new password input by the user, the new password in the internal memory unit.

11. A method of accessing an external memory, the method comprising:
    determining if a detachable external memory device is installed;
    determining, if the external memory device is installed, an identification of the installed external memory device;
    extracting information corresponding to the installed external memory device from an internal memory;
    determining if the extracted information matches corresponding information from the installed external memory device; and
    accessing the installed external memory device if the extracted information matches the corresponding information,
    wherein the extracting of the information comprises extracting a password, corresponding to a serial number of the installed external device, from a database of the internal memory,
    wherein the determining if the extracted information matches the corresponding information from the installed external memory device comprises comparing the extracted password with a password from the installed external memory device.

12. The method of claim 11, wherein the determining of the identification comprises identifying a serial number of the installed external memory device.

13. The method of claim 12, wherein the extracting of the information comprises extracting a password, corresponding to the serial number of the installed external device, from a database of the internal memory.

14. The method of claim 13, wherein the determining if the extracted information matches the corresponding information from the installed external memory device comprises comparing the extracted password with a password from the installed external memory device.

15. The method of claim 14, further comprising:
    requesting input of a new password if the extracted password does not match the password from the installed external memory device; and
    determining if the new password matches the password from the installed external memory device.

16. The method of claim 11, further comprising:
    determining if an automatic information decrypting option, corresponding to the identification of the installed external memory device, is set in the internal memory, wherein the extracting of the information corresponding to the installed external memory device proceeds if the option is set.

17. The method of claim 16, further comprising:
requesting input of new information if the extracted information does not match the corresponding information from the installed external memory device; and
determining if the new information matches the corresponding information from the installed external memory device.

18. The method of claim 17, wherein the requesting input of the new information comprises requesting input of a new password.

19. The method of claim 18, further comprising:

determining, if the new password matches the password of the installed external memory device, if the extracted password is to be changed; and replacing the extracted password with the new password if it is determined that the extracted password is to be changed.

* * * * *